United States Patent [19]

Agger

[11] Patent Number: 5,498,141
[45] Date of Patent: Mar. 12, 1996

[54] HYGIENIC TANK LORRY PUMP AND TANK TRUCK

[75] Inventor: Frode Agger, Rye, Denmark

[73] Assignee: APV Rosista A/S, Horsens, Denmark

[21] Appl. No.: 326,429

[22] Filed: Oct. 20, 1994

[30] Foreign Application Priority Data

Nov. 2, 1993 [DK] Denmark ................. 9300484

[51] Int. Cl.$^6$ ..................................... F04B 17/06
[52] U.S. Cl. ........................ 417/231; 417/390; 417/375
[58] Field of Search ..................... 417/231, 405, 417/375, 379, 380, 390; 141/231; 180/54.3; 222/626, 627; 137/351, 899.4

[56] References Cited

U.S. PATENT DOCUMENTS

| | | | |
|---|---|---|---|
| 2,060,484 | 11/1936 | Barrett | 222/267 |
| 2,506,911 | 5/1950 | Zeigler | 417/390 |
| 2,528,131 | 10/1950 | Garretson | 417/390 |
| 3,279,383 | 10/1966 | Smith | 417/390 |
| 3,567,342 | 3/1971 | Jackson | 417/364 |
| 3,783,867 | 1/1974 | Summersby et al. | 128/230 |
| 3,796,518 | 3/1974 | Weaver | 417/364 |
| 3,951,567 | 4/1976 | Rohs | 415/119 |
| 4,177,017 | 12/1979 | Schultz | 417/231 |
| 4,637,778 | 1/1987 | Pollari | 417/53 R |
| 4,793,386 | 12/1988 | Sloan | 141/231 |
| 4,804,313 | 2/1989 | Nasvytis | 415/53 T |
| 5,195,330 | 3/1993 | Kado et al. | 62/137 |
| 5,222,875 | 6/1993 | Clark | 417/390 |
| 5,238,372 | 8/1993 | Morris | 417/393 |
| 5,244,352 | 9/1993 | Mugele | 417/69 |
| 5,364,228 | 11/1994 | Henning et al. | 415/55.1 |

FOREIGN PATENT DOCUMENTS 2240764  8/1991  United Kingdom ............. 141/231

*Primary Examiner*—Richard A. Bertsch
*Assistant Examiner*—Peter G. Korytnyk
*Attorney, Agent, or Firm*—Lowe, Price, LeBlanc & Becker

[57] ABSTRACT

A hygienic tank truck pump for pumping liquid articles of food, such as milk, from either a stationary tank to the tank of a tank truck or between the tank truck and a tailer trunk coupled to the tank truck. The hygienic pump includes a side channel pump, a hydraulic motor for driving the side channel pump, and a hydraulic system of the tank truck for supplying hydraulic fluid to the motor. As a result, the tank truck pump is self-priming and presents a high capacity relative to weight and the capability of simple cleaning.

6 Claims, 1 Drawing Sheet

HYGIENIC TANK LORRY PUMP AND TANK TRUCK

TECHNICAL FIELD

The invention relates to a hygienic tank truck pump for pumping liquid articles of food, such as milk, from a stationary tank to the tank of a tank truck or between the latter tank and a trailer tank coupled to the tank truck.

BACKGROUND ART

Previously, a hygienic tank truck pump of the self-priming type was used for pumping milk from the stationary milk tank of a farmer into the mobile tank truck of the dairy. When the tank truck is coupled to a trailer tank, viz. a trailer for a truck, the pump in question is often used for pumping milk from the tank of the tank truck into the trailer tank. At the dairy the tank of the tank truck, and the trailer tank are, however, emptied by means of another pump.

Previously either a vacuum pump, viz. a rotor compressor or a rotor vacuum pump, or a conventional liquid ring pump was used as tank truck pump due to the demand for an automatic drawing capacity, said pumps being provided with either eccentrically arranged rotor blades or with a worm/screw arrangement in the liquid ring.

The structure of vacuum pumps provides said pumps with a satisfying self-priming capacity, but the pumping capacity (m³/h) is very low with the result that the users face long operation periods and a reduced efficiently of the tank truck. In addition, a vacuum pump must be disassembled when it is to be cleaned.

Conventional liquid ring pumps are seldom used because they must be very large, heavy, and energy-demanding in order to yield the necessary capacity. These pumps are not hygienic either as they cannot be satisfactorily cleaned.

BRIEF DESCRIPTION OF THE INVENTION

The object of the invention is to provide a tank truck pump of the above type which combines the ability to be self-priming, have a high capacity relative to the weight, and satisfying, simple cleaning possibilities.

In satisfaction of the foregoing object there is provided a hygienic tank truck pump which according to the invention is characterized in that it is formed by a self-priming side channel pump, which can be driven by a hydraulic motor in turn being driven by the hydraulic system of a tank truck. In this manner a satisfying automatic drawing capacity combined with a high pumping capacity is obtained. Furthermore, the pump can be hygienically cleaned by the so-called CIP-method (clean in place) involving an external pumping, i.e. a flushing according to a specific system without necessitating a disassembling of the parts of the pump. In addition, the side channel pump does not destroy the fat structure of the raw milk when used for the pumping of raw milk. In other words the pump has no homogenizing effect on the milk.

The advantages of the new tank truck pump are as follows:

high pumping capacity (increased efficiency of the tank truck, high self-priming capacity, it is easy to clean hygienically by CIP; it does not require a disassembling of the pump, high efficiency compared to a liquid ring pump, limited maintenance, and compact structure, i.e. small volume and low weight.

According to the invention, the central shaft of the side channel pump may advantageously be mounted on a countershaft mounted in a bearing housing, said countershaft being connected to the drive shaft of the hydraulic motor.

Furthermore according to the invention the side channel pump may be provided with a drain cock for securing against frost and removal of residues of CIP-liquid.

In addition according to the invention the side channel pump may be mounted on the tank truck adjacent the inlet of the tank thereof and besides in such a manner that reliable priming of the side channel pump is allowed when said pump is to be started either by way of a natural inlet of liquid articles of food from one of the tanks or by way of a manual priming or a self-priming, and the hydraulic motor of the side channel pump may be coupled to the hydraulic system of the tank truck. In this manner the side channel pump operates most efficiently.

The side channel pump may according to the invention be mounted in an optionally height-adjustable hygienic box, and the bearing housing may optionally be mounted in a wall in the box, and the hydraulic motor may be mounted on the outside of the box, whereby the side channel pump is well protected.

BRIEF DESCRIPTION OF THE DRAWINGS

The invention is described in greater detail below with reference to the accompanying drawing, in which.

DESCRIPTION OF PREFERRED EMBODIMENTS

Figure 1:
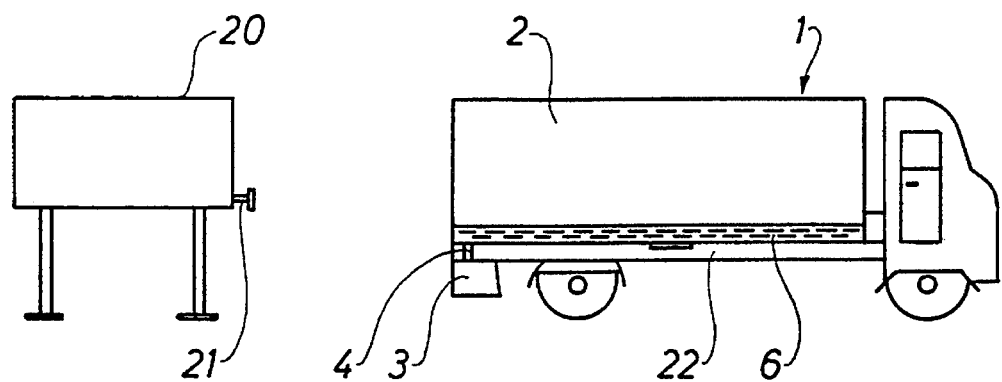
FIG. 1 illustrates a tank truck provided with a side channel pump, as well as a stationary tank.

The tank truck shown in FIG. 1 is provided with a tank 2 for the transport of liquid articles of food, such as milk. The tank is filled or emptied by means of a tank truck pump 30 not shown, cf. FIG. 2, said pump being mounted in a hygienic box 3 accommodated on a suitable level on the tank truck. The tank truck pump 30 is driven by a hydraulic motor not shown in the drawing, said hydraulic motor in turn being driven by the hydraulic system of the tank truck indicated by the two broken lines 6.

Figure 2:
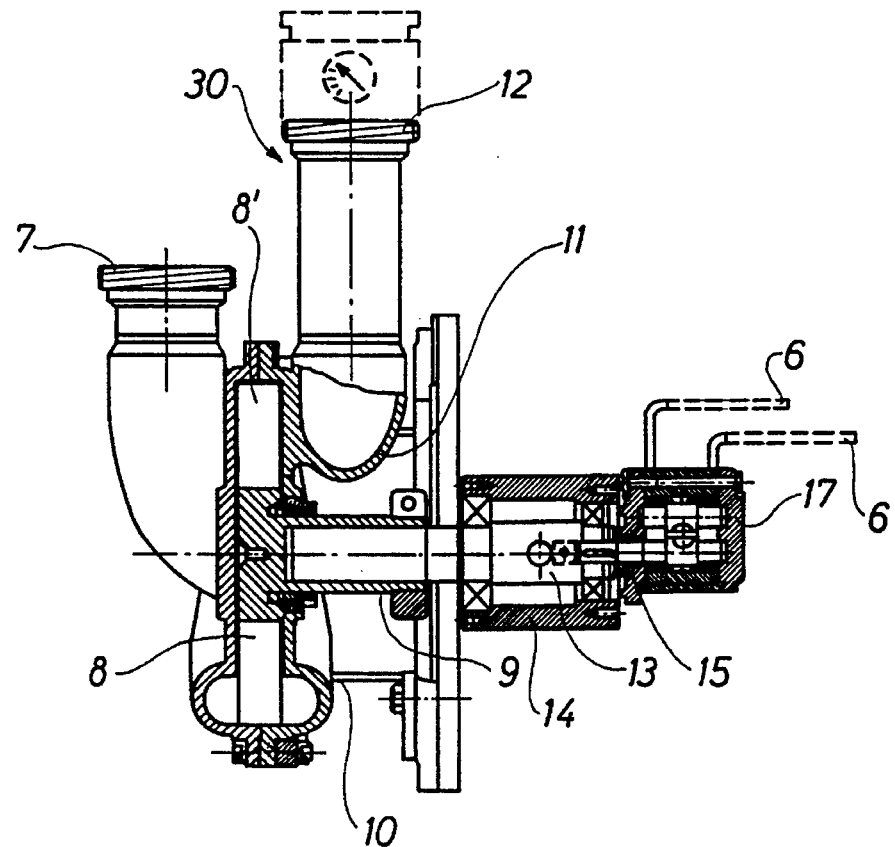
FIG. 2 is a diagrammatic view of how the side channel pump can be driven by a hydraulic motor of a hydraulic system associated with the tank truck.

FIG. 2 illustrates on a larger scale the used tank truck pump which is a side channel pump 30. It comprises an inlet 7 and an impeller 8 with a considerable number of blades. The impeller is mounted at the end of a central shaft 9 in turn mounted in the housing 10 of the side channel pump. When the side channel pump is operating, i.e. when the impeller 8 rotates, the liquid article of food is pressed outwards inside the housing 10. For instance from the "upper" part 8' said liquid article of food is pressed to the side and outwards into the side channel 11 of the pump and subsequently further out into the discharge pipe stub 12. As it appears the central shaft 9 of the side channel pump can be connected to a countershaft 13 in a bearing housing 14, and this countershaft 13 is in turn connected to a drive shaft 15 on the hydraulic motor 17.

Adjacent the lowest end the side channel pump, a drain cock, not shown, is provided for the removal of residues of cleaning fluid, viz. the fluid used for flushing and cleaning the pump, so-called CIP-fluid, cf. FIG. 2. The cock can also be used for removing possible small residues of liquid in the pump, whereby the problems of frost bursts caused by freezing of these residues is avoided.

The side channel pump 30 is mounted on the tank truck adjacent the inlet 4 of the tank 2, and at a level relative to a stationary tank 20 (or trailer tank, i.e. a tank, not shown, which is positioned on a trailer for the tank truck 1) such that it is ensured that the side channel pump 30 can be reliably primed when it is to be started. The priming is performed either by a natural flow of liquid articles of food from the stationary tank or manually or automatically. The manual priming or the self-priming may involve a priming of the pump with a small amount of clean water. A suitable level for the box 3 and consequently for the side channel pump is the one shown in FIG. 1 in connection with the position illustrated for the stationary tank 20. The connection between the inlet pipe stub 7 of the side channel pump and the outlet pipe stub 21 of the stationary tank 20 is a rubber or plastic hose, not shown. The inlet pipe stub 4 of the tank is connected to the outlet pipe stub 12 of the side channel pump. Nothing, however, prevents various houses and connections from being accommodated in other ways, such as when a liquid article of food is to be pumped from the tank 2 into a trailer tank. In this case the pipe stub of the trailer tank is connected through a pipe hose to the outlet pipe stub 12 of the side channel pump, while the pipe stub 4 of the tank 2 is connected to the inlet pipe stub 7 of the pump.

When the liquid article of food is milk, the stationary tank 20 can be a tank placed at each farmer. The content of the tank 20 is pumped by means of the side channel pump of the tank truck into the tank 2. When the tank truck reaches the dairy, the tank 2 is, however, usually emptied by means of a particular pumping equipment accommodated at the dairy, wherein a stationary tank, not shown, at the dairy is simultaneously filled. This pumping equipment is not shown and has no relation to the present invention. Nothing, however, prevents the side channel pump from being used in this situation too.

The hygienic box 3, cf. FIG. 1, can be adjustable with respect to height so that it can be fixed in various positions on a ladder-like arrangement, not shown, which is secured to the chassis of the tank truck.

As mentioned above, the side channel pump and the bearing housing 14 as well as the hydraulic motor 17 can be mounted inside the box 3. The side channel pump can, however, also be mounted such that the pump itself is positioned inside the box while the bearing housing 14 is mounted in the wall of the box and the hydraulic motor 17 is mounted on the outside of said box.

The supply of hydraulic liquid for the hydraulic motor 17 is performed through pipes 6 in the hydraulic system of the tank truck. These pipes are flexible over the length abutting the hydraulic motor 17 in such a manner that they can follow the motor when and if the level thereof on the tank truck is changed.

The invention can be varied in many ways without thereby deviating from the scope of the invention.

I claim:

1. Hygienic tank truck pump for pumping liquid articles of food, such as milk, between a tank (2) of a tank truck and one of a stationary tank (20) and a trailer tank, comprising:

a self priming side channel pump (30), a hydraulic motor (17) for driving the side channel pump (30), a hydraulic system (6) of the tank truck (1) for supplying hydraulic fluid to the hydraulic motor, wherein the side channel pump (30) includes a central shaft (9), a bearing housing (14), and a countershaft (13) mounted in the bearing housing (14) and on which the central shaft (9) is mounted, and wherein the hydraulic motor (17) includes a drive shaft (15) to which the countershaft (13) is connected.

2. A tank truck pump as in claim 1, wherein the side channel pump (30) is mounted on the tank truck (1) adjacent the inlet of the tank truck to permit priming of the side channel pump (30), and wherein the hydraulic motor (17) of the side channel pump (30) is coupled to the hydraulic system (6) of the tank truck.

3. A tank truck as in claim 2, wherein the side channel pump (30) is mounted in a height-adjustable hygienic box (30), wherein the bearing housing (14) is mounted to a wall of the box (3), and wherein the hydraulic motor (17) is mounted to the outside of the box (3).

4. A tank truck as in claim 2, wherein the pump is primed by a natural inlet of liquid articles of food from one of the tanks.

5. A tank truck as in claim 2, wherein the pump is manually primed.

6. Hygienic tank truck pump for pumping liquid articles of food, such as milk, between a tank (2) of a tank truck and one of a stationary tank (20) and a trailer tank, comprising:

a self-priming side channel pump (30), a hydraulic motor (17) for driving the side channel pump (30), a hydraulic system (6) of the tank truck (1) for supplying hydraulic fluid to the hydraulic motor, wherein the side channel pump (30) includes a drain cock (16) for securing against frost and removal of residues of CIP-liquid.

* * * * *